United States Patent
Moore et al.

[19]

[11] Patent Number: 6,064,003
[45] Date of Patent: May 16, 2000

[54] GROMMET AND CONNECTOR SEAL FOR USE WITH FLAT FLEXIBLE CABLE

[75] Inventors: Nathan J. Moore, Dearborn; David J. Berels, Belleville, both of Mich.

[73] Assignee: Lear Automotive Dearborn, Inc, Southfield, Mich.

[21] Appl. No.: 09/061,395

[22] Filed: Apr. 16, 1998

[51] Int. Cl.⁷ ...................................................... H02G 3/18
[52] U.S. Cl. ................ 174/65 G; 174/65 G; 174/152 G; 174/153 G; 248/56; 16/2.1; 439/604
[58] Field of Search .................... 174/31 R, 65 R, 174/65 G, 135, 117 F, 151, 152 G, 153 G, 167; 248/56; 439/587, 274, 275, 604, 606, 736, 936, 589; 16/2.1

[56] References Cited

U.S. PATENT DOCUMENTS

| | | | |
|---|---|---|---|
| 3,634,806 | 1/1972 | Fergusson | 439/497 |
| 4,797,513 | 1/1989 | Ono et al. | 174/153 G |
| 5,188,535 | 2/1993 | Bertho et al. | 439/83 |
| 5,270,487 | 12/1993 | Sawamura | 174/31 R |
| 5,573,429 | 11/1996 | Miyazaki et al. | 439/587 |
| 5,780,774 | 7/1998 | Ichikawa et al. | 174/88 R |

*Primary Examiner*—Kristine Kincaid
*Assistant Examiner*—Dhiru R Patel
*Attorney, Agent, or Firm*—MacMillan, Sobanski & Todd, LLC

[57] ABSTRACT

A grommet used with flat flexible cable provides a seal between an inner compartment of an automobile and an exterior environment. This simplifies the use of flat flexible cable in automobile wiring harness assemblies. In another aspect of this invention, a cable connector assembly for joining an end of the cable includes a closed cell foam seal to provide a water-tight seal between the cable, the terminals and the exterior environment.

8 Claims, 3 Drawing Sheets

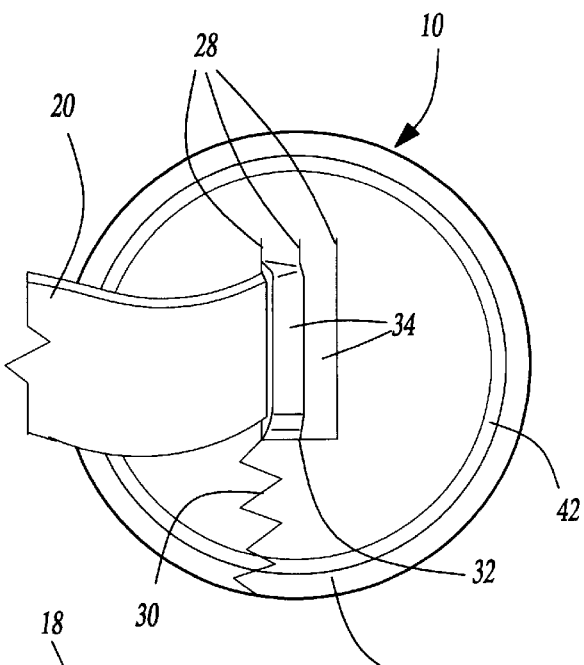
*Fig-4*
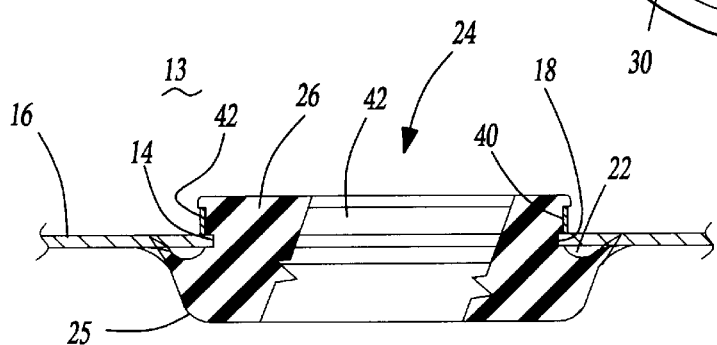
*Fig-5*
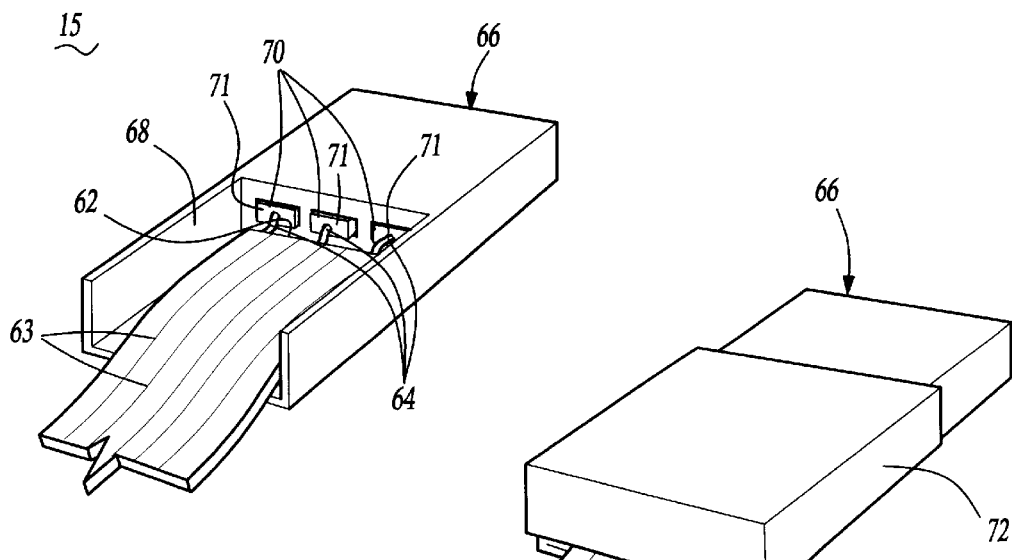
*Fig-6*
*Fig-7*

GROMMET AND CONNECTOR SEAL FOR USE WITH FLAT FLEXIBLE CABLE

BACKGROUND OF THE INVENTION

The invention relates to a grommet and connector for use with flat flexible cable wiring harnesses.

Traditional automotive wiring can pass from the interior of the vehicle to a door or trunk. At the point where the wiring exits the interior of the vehicle, the wiring must be protected from environmental elements and the interior of the automobile must be sealed from those environmental elements. In the past, the wiring used in automobiles was typically circular in cross-section and was easily sealed at openings in the automobile by utilizing conventional rubber or plastic grommets to seal the interior of the vehicle.

More recently, flat flexible cable has been proposed for use in wiring and wiring harnesses in automobiles. Conventional grommets are ill-suited for providing a seal on flat cable to prevent environmental elements, such as water, from leaking into the interior of an automobile.

Wiring harnesses include connectors disposed at each end for connection to a component or second harness. The connectors are also exposed to environmental elements such as water. Sealing the connector housing to prevent water from contacting the internal wires is desirable to ensure that no corrosion occurs within the connector housing. Providing a water-tight connector has proven difficult and expensive. Traditional solutions for sealing connector housings are not readily applicable to flat wire technology.

SUMMARY OF THE INVENTION

The present invention is directed toward providing solutions, which are absent from the prior art, for use in sealing wiring harnesses, their components, and interior compartments of automobiles from environmental exposure. In one main aspect of this invention, a grommet is adapted to seal flat flexible cable or cables passing through a wall of an automobile from the exterior environment. The grommet is less expensive to manufacture and more easily assembled and inserted into an automobile than prior art devices. The grommet is formed of a resilient material which can conform to an opening into which the grommet is inserted. The grommet includes at least one internal slit for receiving the flat cable. An entry slit allows for the internal slits to be spread apart to permit the flat cable to be inserted into the internal slits. The entry slit can subsequently be closed to provide a seal between the wall and the cable. The grommet can also include a band disposed in an annular groove about its periphery to tighten the grommet around the flat cables.

Another feature of this invention is a connector assembly for joining the ends of one or more flat flexible wire cable pairs. The connector assembly includes a molded foam to provide a water tight seal which ensures that no corrosion occurs within the connector housing. A connector housing is disposed about the molded foam to keep the foam under compression and in positive contact with ends of a cable received in the foam and connected to terminals also received in the foam. Preferably, a closed cell foam is used.

These and other features of the present invention will be best understood from the following specification and drawings, of which the following is a brief description.

BRIEF DESCRIPTION OF THE DRAWINGS

FIG. 4 is an end view of an alternative embodiment of the grommet in accordance with the present invention;

FIG. 5 is a cross-sectional side view of the grommet shown in FIG. 4 inserted into the wall of an automobile;

FIG. 6 is a perspective view of a female portion of the connector assembly in accordance with the present invention;

FIG. 7 is a perspective view which shows foam molded over the female connector;

DETAILED DESCRIPTION OF THE PREFERRED EMBODIMENT

Figure 1:
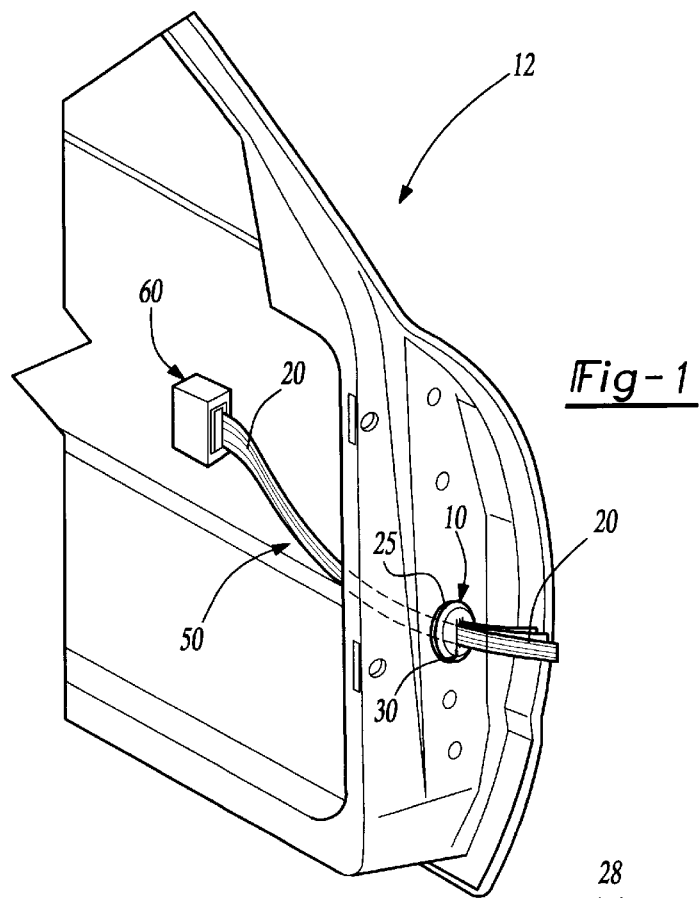
FIG. 1 is a side view of an automobile including the grommet and connector assembly in accordance with the present invention.

FIG. 1 shows an automobile 12 in which a wiring harness 50 is disposed. The wiring harness 50 includes a flat flexible cable 20 affixed at one end to a connector assembly 60. The other end of the flat flexible cable 20 passes through a grommet 10 disposed in an aperture 14 in a wall 16 of the automobile 12.

Figure 2:
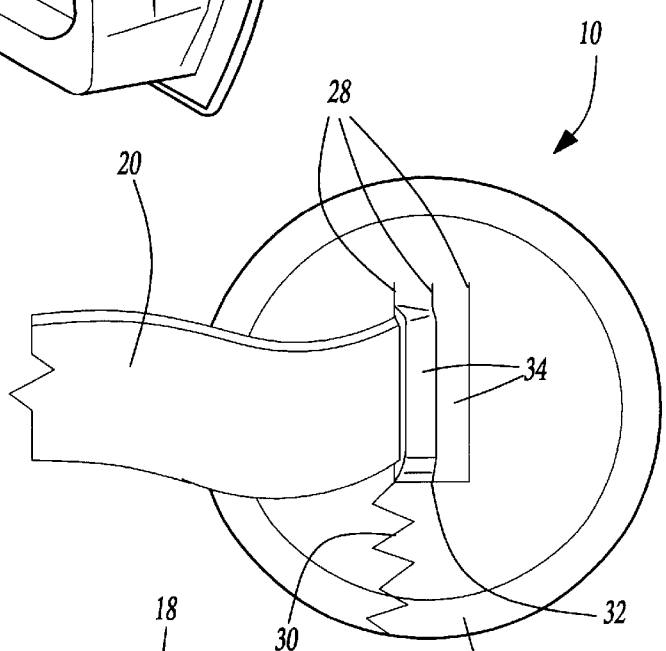
FIG. 2 is an end view of the grommet of the present invention.
Figure 3:
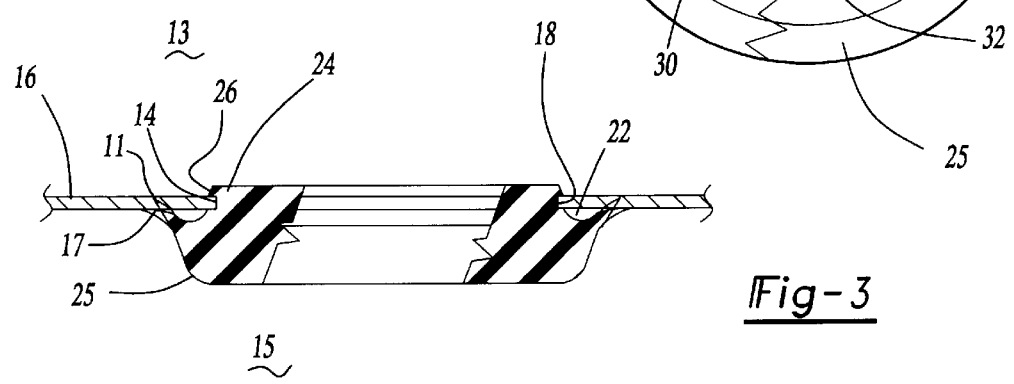
FIG. 3 is a cross-sectional side view of the grommet inserted into the automobile.

Referring specifically to FIGS. 2 and 3, the grommet 10 includes an inner peripheral flange 24 and an outer peripheral flange 25. The inner peripheral flange 24 and the outer peripheral flange 25 define a continuous groove 22 therebetween. The inner peripheral flange 24 also includes an angled ramping surface 26 which allows for easier insertion of the grommet 10 through the wall 16 of the automobile 12. The inner peripheral flange 24 becomes disposed in an interior compartment 13 of the automobile 12 while the outer peripheral flange 25 remains on an exterior region 15 of the automobile 12.

The groove 22, inner peripheral flange 24, and the outer peripheral flange 25 have a contour which is complementary to the shape of the aperture 14. That is, the shape of the grommet 10 can be designed to fit any specific aperture opening or shape such as circular, square, rectangular, etc. by changing the contours of the peripheral inner flange 24 and the peripheral outer flange 25. The groove 22 is adapted to receive a lip 18 of the aperture 12 disposed in the wall 16 and establishes a seal between the grommet and the lip 18 of the aperture 12.

A forward lip 11 is deformed from a relaxed position to a sealing position 17 at which it provides a good seal around aperture 12.

The grommet 20 also includes at least one internal slit 28 which is adapted to receive and allow the flat flexible electrical cable 20 to pass therethrough. Several slits 28 are preferably disposed parallel to one another and define fingers 34 which provide a seal between the cable 20 and the remainder of the grommet 10.

Another slit 30 extends inwardly from the periphery of the grommet 10 and terminates at a slit 32 which is substantially transverse to, and is connected to an end of each of the internal longitudinal slits 28. The slit 30, beginning at the periphery of the grommet 10 and the internal longitudinal slits 28, are spread apart to permit the flat flexible cable 20 to be inserted into each of the one or more internal slits 28. The slits 28 are subsequently closed and the grommet 10 can be inserted into the aperture 12 of the wall 16 to provide a seal between the wall 16 and the cables 20. In other words, the grommet 10 is provided with a plurality of substantially parallel internal slits 28 wherein the internal transverse slit 32 connects the slits 28 at one end to define the plurality of fingers 34. The slit 30 begins at the periphery of the grommet 10 and extends to and connects to the transverse slit 32 whereby the plurality of fingers 34 are adapted to engage and sealingly retain each of the flat electrical cables 20.

Referring to FIGS. 4 and 5, an alternative embodiment of the grommet 10 is shown. In this embodiment, a band 42 is disposed in an annular groove 40. The band provides an inwardly directed force onto the grommet 10 thereby compressing or tightening the grommet 10 around the flat flexible cables 20 such that the seal created around the flat flexible cable 20 is kept in compression to provide a water-tight seal around the flat flexible cable 20. The band 42 can be constructed of a number of suitable materials including a metal or a plastic material. Preferably, if metal is chosen; stainless steel is used.

The material of which the grommet 10 is formed is preferably a resilient or elastomeric material such as, for example, ethylene propylene diene or polyurethane. The material preferably has a hardness of between about 20 shore A and about 80 shore A. More preferably, the hardness of the material comprising the grommet is approximately 50 shore A.

The slit 30 preferably has a non-linear sinuous curve or jagged interlocking profile to prevent movement of the walls of the slit 30 with respect to each other when pressure is applied to the grommet. Additionally, the non-linear, sinuous curve or interlocking profile serves to inhibit the migration of water into the grommets thereby enhancing the ability of the grommet 10 to provide a seal between the interior 13 and exterior 15 of the automobile 12.

Figure 8:
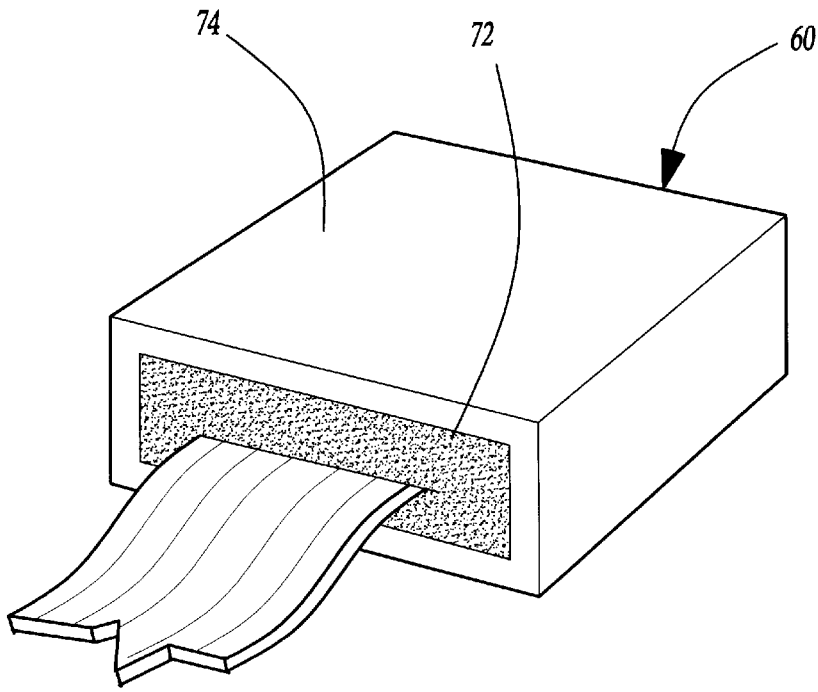
FIG. 8 is a perspective view which shows the connector assembly in accordance with the present invention.

Referring to FIGS. 6–8, the cable connector assembly 60 includes a connector body 66 having a recess 68 for receiving and retaining an end 62 of a flat flexible cable 20 therein. Conductors 63 which are disposed within the cable 20 are exposed at 64 and extend from the end 62 of the cable 20 and are connected to conductive terminals 70. The terminals 70 are receivingly retained within cavities 71 disposed in the connector 66 and extend through the connector 66 where they can be connected to a plug or socket (not shown). The exposed conductors 64 are connected to the terminals 70 by means well known to those skilled in the art such as sonic welding. The terminals 70 may be male or female connectors.

In order to provide a water-tight seal over the joinder of the terminals 70 and connectors 64, a closed cell foam covering 72 is molded over the joinder of the terminals 70, connector 66, and conductors 64 of the cable 20. The closed cell foam covering 72 can be injection molded over the joinder of the terminal 70, conductors 64, and connector 66 by disposing the connector 66 into a mold and then injecting a material which forms a closed cell foam covering 72. Preferably, the closed cell plastic foam is a polyurethane, however, other suitable chemicals which form a foam may be used. The foaming step is accomplished utilizing techniques well known to those in the art of injection molding and polymer technology.

Referring to FIG. 8, after the closed cell foam covering 72 is disposed about the joinder of the terminal 64 and connector 66, a connector housing 74 is disposed under compression over the connector 66 and molded foam covering 72 to provide a positive seal.

Figure 9:
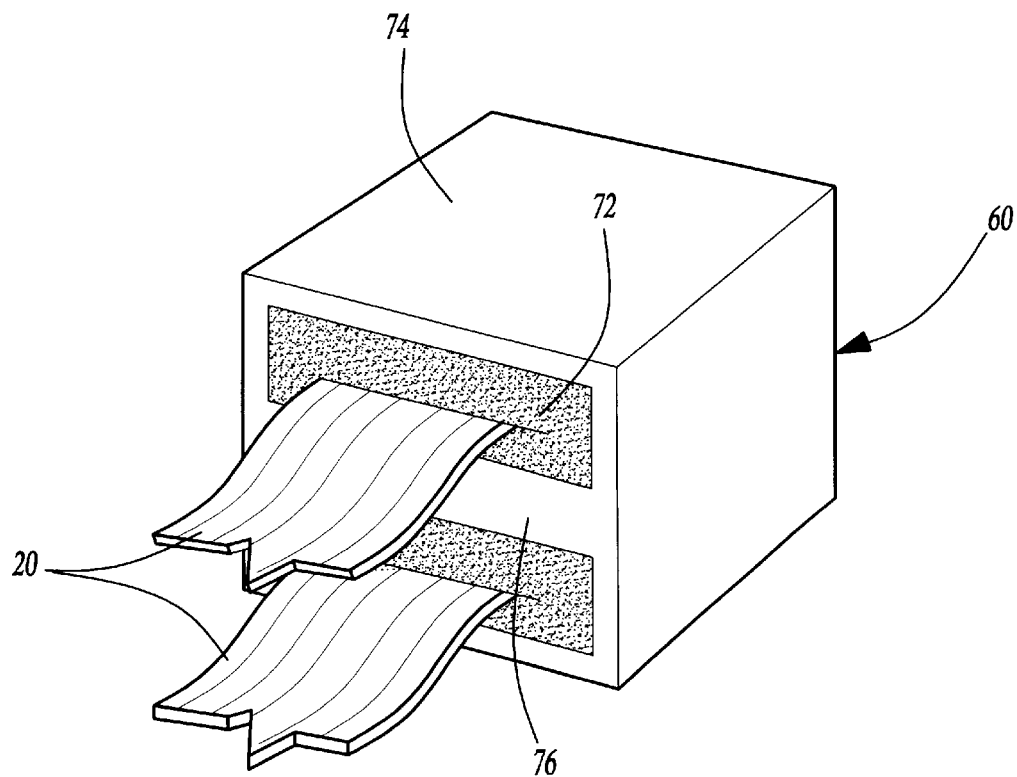
FIG. 9 is an alternative embodiment of the connector assembly in accordance with the present invention.

Referring to FIG. 9, an alternative embodiment of the connector assembly 60 is shown. In this embodiment, multiple flat flexible cables 20 are received within a single connector assembly 60. This is accomplished by providing at least one transverse divider 76 in the housing 74 to separate the individual flat flexible cables 20 from each other.

The connector 66 and the connector housing 74 are preferably constructed of a suitable plastic material such as polystyrene, polypropylene, or the like.

Preferred embodiments of this invention have been disclosed; however, one of ordinary skill in the art would recognize that certain modifications come within the scope of this invention. For that reason, the following claims should be studied to determine the true scope and content of this invention.

What is claimed is:

1. A vehicle cable assembly comprising:

a flat flexible electrical cable extending through an aperture in a wall separating an interior compartment from an exterior environment;

a grommet received in said aperture to seal said cable at said aperture, said grommet being formed of resilient material and having a peripheral contour complimentary to a shape of said aperture, said grommet having a groove adapted to receive a lip of said aperture, and an internal slit, said cable extending through said internal slit; and an entry slit beginning at a periphery of said grommet and extending to said internal slit.

2. A vehicle cable assembly according to claim 1 including a plurality of internal slits provided in said grommet, and a crossing slit connected to ends of said internal slits, wherein said entry slit extends to said crossing slit.

3. A vehicle cable assembly according to claim 2, wherein said plurality of said internal slits are generally parallel to each other, and said crossing slit is transverse to each of said parallel internal slits, connects said internal slits at one end to define a plurality of internal fingers.

4. A vehicle assembly according to claim 1, wherein an annular groove is provided at the periphery of said grommet and a band is inserted into said annular groove, thereby tightening said grommet around said flat cable.

5. A vehicle cable assembly according to claim 4, wherein said band is formed of a metal material.

6. A vehicle cable assembly according to claim 4, wherein said band is formed of a plastic material.

7. A vehicle cable assembly according to claim 1, wherein said entry slit is non-linear to prevent movement of walls of said entry slit with respect to each other.

8. A vehicle cable assembly according to claim 1, wherein said cable is connected to a connector having terminals, further including foam covering a connection between said terminals and said cable.

* * * * *